No. 783,522. PATENTED FEB. 28, 1905.
H. H. HARSHAW.
COMBINATION THILL DETACHER AND BRAKE.
APPLICATION FILED SEPT. 6, 1904.
3 SHEETS—SHEET 1.
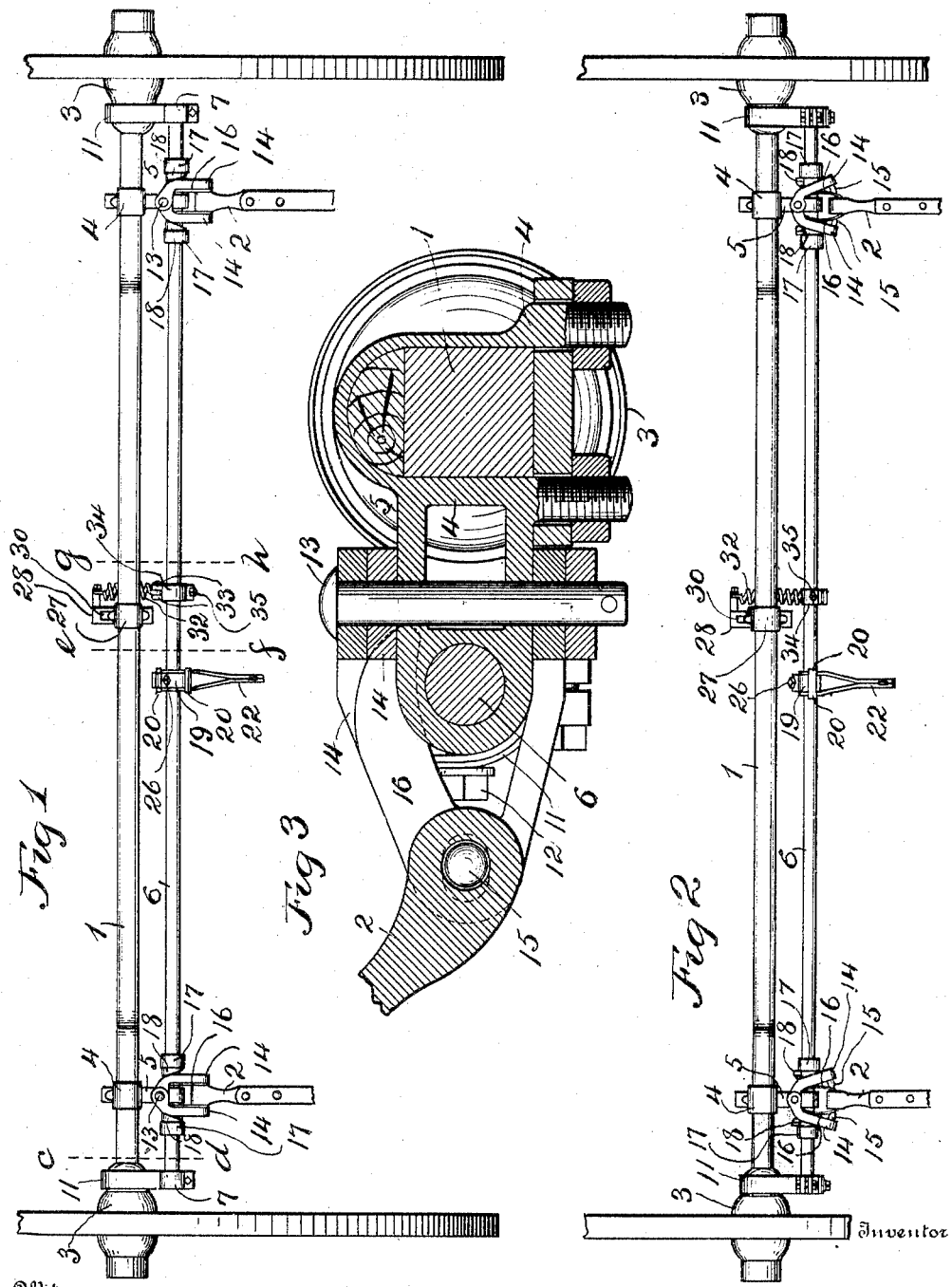
Witnesses:
R. E. Hamilton.
F. C. Priestly.
Inventor
Harlan H. Harshaw
By Warren D. House,
His Attorney

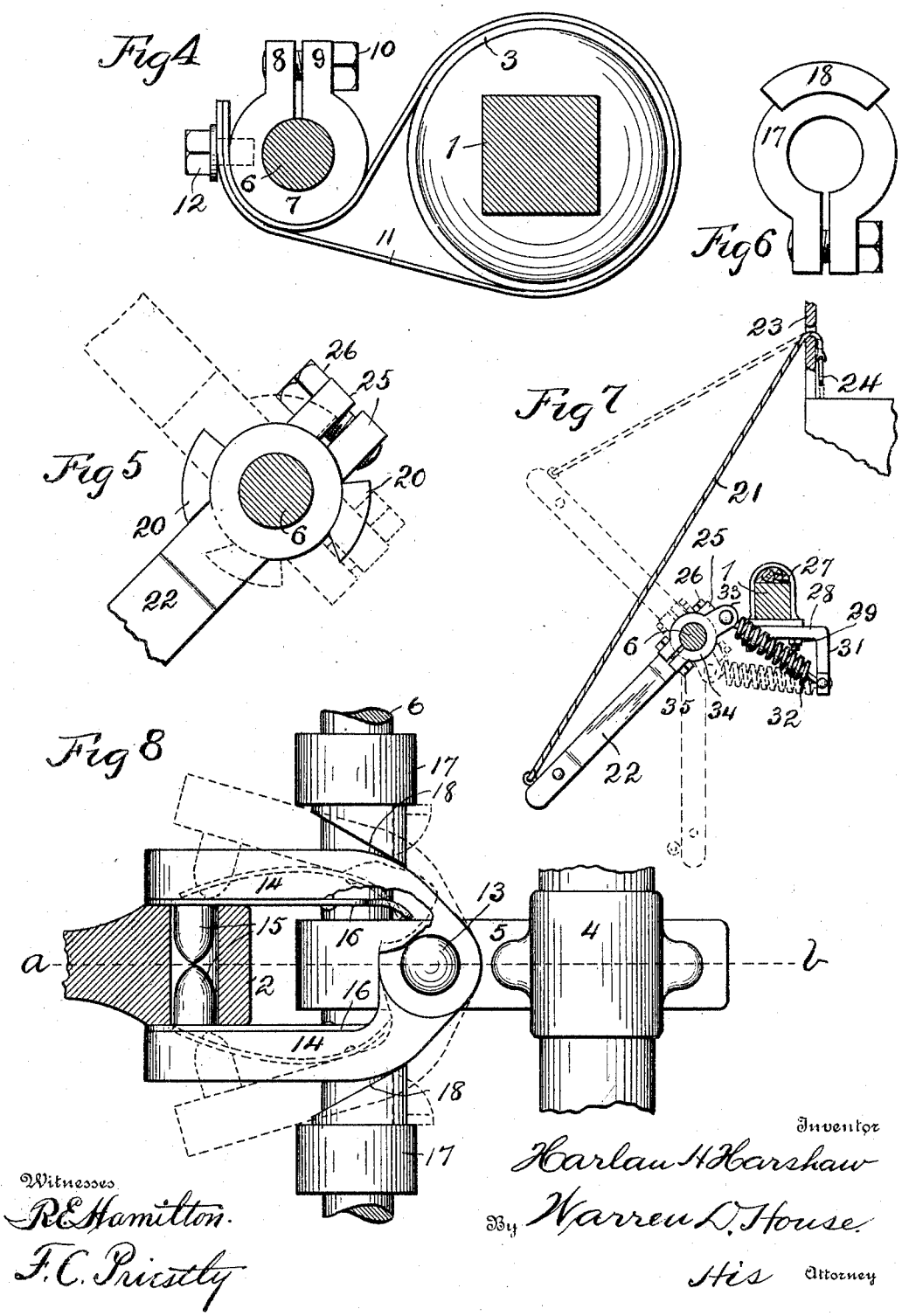

No. 783,522. PATENTED FEB. 28, 1905.
H. H. HARSHAW.
COMBINATION THILL DETACHER AND BRAKE.
APPLICATION FILED SEPT. 6, 1904.
3 SHEETS—SHEET 3.
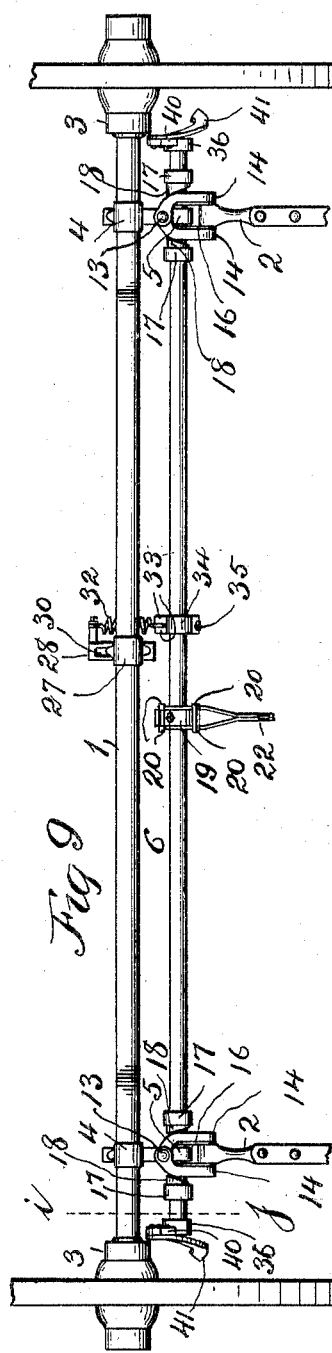
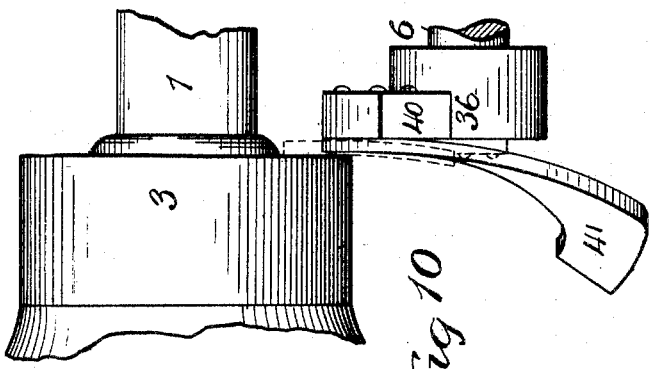
Witnesses:
R. E. Hamilton.
F. C. Priestly.
Inventor
Harlan H. Harshaw,
By Warren D. House,
His Attorney No. 783,522.

Patented February 28, 1905.

UNITED STATES PATENT OFFICE.

HARLAN H. HARSHAW, OF BUTLER, MISSOURI.

COMBINATION THILL-DETACHER AND BRAKE.

SPECIFICATION forming part of Letters Patent No. 783,522, dated February 28, 1905.

Application filed September 6, 1904. Serial No. 223,346.

*To all whom it may concern:*

Be it known that I, HARLAN H. HARSHAW, a citizen of the United States, residing at Butler, in the county of Bates and State of Missouri, have invented a new and useful Improvement in a Combination Thill-Detacher and Brake, of which the following is a specification, reference being had to the accompanying drawings, forming a part thereof.

My invention relates to improvements in combination thill-detacher and brake mechanisms.

The object of my invention is to provide a device by which the thills may be quickly detached from the vehicle, thus releasing the horse or horses from the vehicle and preventing liability of injury to the driver or occupants of the vehicle.

My invention provides, further, an emergency-brake which is applied simultaneously with the detaching of the thills. By the ready removal of the thills economy of space in the stable is obtained. Other novel features are hereinafter fully described and claimed.

In the accompanying drawings, Figure 1 is a top view showing the thills engaged. Fig. 2 is a top view showing the positions of the parts when the thills are being released. Fig. 3 is an enlarged vertical sectional view taken on the dotted line *a b* of Fig. 8. Fig. 4 is a cross-section taken on the dotted line *c d* of Fig. 1. Fig. 5 is a cross-section taken on the dotted line *e f* of Fig. 1. Fig. 6 is an end elevation view of one of the cams used to close the jaws 14. Fig. 7 is a cross-section taken on the dotted line *g h* of Fig. 1. Fig. 8 is a top view, enlarged, of one of the thill-couplings. Fig. 9 is a top view of the mechanism, showing another form of brake, the parts being shown in the positions occupied by them when the thills are engaged with the jaws 14. Fig. 10 is a top view of one brake of the form shown in Fig. 9 and also a part of the adjacent wheel and axle. Fig. 11 is a cross-section taken on the dotted line *i j* of Fig. 9.

Similar characters of reference denote similar parts.

1 denotes the vehicle-axle, 2 the thills, and 3 the wheels mounted on the axle.

4 denotes two clips of the ordinary construction, mounted on the axle 1 adjacent the ends of the axle, respectively. A projection 5 is provided on the forward side of each clip, each projection being provided with a transverse horizontal hole in which is mounted a rock-bar 6. On each end of the rock-bar 6 is secured in any desired manner a collar 7 adjustable lengthwise and circumferentially of the said bar. Each of said collars is preferably transversely split and provided with two peripheral ears 8 and 9, the said ears being provided each with a transverse hole in which is mounted a screw-threaded bolt 10, which rotates freely in one ear and engages screw-threads in the other ear. By properly adjusting the bolts 10 the collars 7 may be securely held in any position on the bar 6 to which they may be adjusted. Encircling each hub of each wheel 3 is a brake-strap 11, preferably of steel and having its ends secured by means of a screw 12 to the adjacent collar 7. By rocking the bar 6 in the proper direction the strap 11 may be made to tightly bind on the hub of the adjacent wheel. Each projection 5 on each clip 4 is provided in the rear of the bar 6 with a vertical hole in which is mounted a pin 13, to which are pivoted above and below the projection 5 the rear ends of two V-shaped jaws 14, the forward end of each of which is provided with a horizontal projection 15 on the inner side of the jaw and adapted to enter the transverse hole with which the rear end of each thill 2 is provided.

On the inner side of each jaw 14 is secured a flat spring 16, the forward end of which bears upon the outer side of the adjacent thill 2 and the rear end bearing upon the outer side of the projection 5 in front of the pin 13. The forward end of each spring 16 is provided with a transverse hole through which the adjacent projection 15 is adapted to extend. The springs 16 are normally inwardly curved, as shown in dotted lines in Fig. 8, so that they tend by their tension to swing the jaws 14 away from each other, thus releasing the thills 2 from the projections 15 on the jaws. The springs 16 by their pressure on the thills also serve to prevent rattle of the thills. On the rock-bar 6 at each side of each thill-coupling is secured a collar 17, having a cam-face 18, adapted to bear upon the adjacent jaw 14. By properly rocking the bar 6 the cam-collars 17 force the jaws 14 toward each other, so as to force the projections 15 into the holes of the thills against the pressure of the springs 16.

Upon the bar 6 near its middle is secured a split or pinch collar 19. (Best shown in Fig. 5.) At each end of this collar is provided a pair of oppositely-disposed projections 20. A lever comprising two forwardly-extending bars 22 is pivoted at its rear end upon the bar 6, the bars being mounted at opposite ends of the collar 19 and between the projections 20. The forward ends of the bars 22 are secured together and have secured to them at the forward ends a cable or cord 21, which extends upwardly through an eye provided in the dashboard 23, the upper end of the cord 21 having secured to it a ring 24, by which the cord is upwardly drawn for the purpose of rocking the bar 6, so as to permit the jaws 14 to open and release the thills and at the same time to apply the brake bands or straps 11 to the wheel-hubs. The collar 19 (best shown in Fig. 5) is provided with two ears 25, each having a hole therethrough in which is located a bolt 26, the ear opposite the head of the bolt being threaded, so that by turning the bolt the collar may be tightened on the bar 6. On the axle 1, adjacent the collar 19, is secured an ordinary clip 27. (Best shown in Fig. 7.) A slotted plate 28 is mounted on the threaded shanks of the clip 27 below the axle 1 and is held thereon by the nuts 29. The slot 30 in the plate 28 permits forward and rearward adjustment of the plate to suit different shapes of axles. At the rear end of the plate 28 is provided a downwardly-extending projection 31, to which is secured the rear end of a compression-spring 32, the forward end of which is secured to and between two parallel peripheral arms 33 on a split or pinch collar 34, mounted on the bar 6, at one side of the collar 19. This collar 34 is provided with two ears, each having a hole, one of which is threaded. In these holes is mounted a bolt 35, by the turning of which the collar may be tightened or loosened on the bar 6. The collar 34 is longitudinally and circumferentially adjustable on the bar 6.

The collar 34 is positioned on the bar 6 so that when the bar 6 is swung to and fro the outer end of the compression-spring 32 will cross a straight line extending from the center of the bar 6 to the point on the plate 28 to which the rear end of the spring is secured. The spring 32 will thus resist swinging of the bar 6 in either direction until said bar has been swung to a position in which the outer end of the spring 32 will have crossed the straight line just referred to, after which the spring 32 will assist in continuing the forward movement of the rock-bar 6 in the direction in which it is being moved. The spring 32 thus serves as a retaining means for holding the bar 6 in either position to which it may be rocked.

In operating my invention when it is desired to release the thills from the vehicle the same may be done by pulling on the cord or cable 21, the driver in the meantime retaining his position in the seat, if desired. When the cord 21 is pulled, the rock-bar will be rocked by the bars 22 in a direction such that the cam-collars 17 will be moved so that the cam-faces 18 will permit the jaws 14 to swing apart or from each other, due to the springs 16. The thills 2 will thus be forced from off the projections 15, and the thills will thus be released and the vehicle freed from the horse or horses. At the same time the collars 7 will be turned so as to draw the ends of the straps 11 forwardly and upwardly, thus tightening the said straps on the hubs of the wheels and stopping forward movement of the vehicle. The compression-spring 32 will then retain the bar 6 in a position in which the jaws 14 will remain open. To reinsert and secure the thills, it is but necessary to place them between the jaws 14 and retract the bar 6 in the opposite direction by swinging downward the bars 22, thus rotating the cam-collars 17 to a position such that they will force the jaws 14 toward each other and cause them to engage the thills.

In Figs. 9, 10, and 11 is illustrated another form of braking device adapted to be used in connection with the thill-detaching mechanism. On the ends of the bar 6 are mounted, respectively, two collars 36, each of which is transversely split and provided with two ears 37, having transverse holes, in which is mounted a threaded bolt 38, having on its threaded end a nut 39, the nut and bolt-head resting, respectively, against the outer sides of the ears 37. By proper adjustment of the nut on the bolt the ears 37 may be made to approach or recede from each other for the purpose of tightening or loosening the collar 36 on the rock-bar 6. On each collar 36 is provided a peripheral projection 40, to the outer side of which is secured one end of a resilient cam 41 in the form of a part of a circle the center of which is the axis of the bar 6. The free end of each cam 41 is disposed in a transverse plane located outside of the transverse plane in which is located the inner end of the cam, the cam having a spiral form. The collars 36 are secured on the bar 6 in positions such that when the parts are in the position shown in Figs. 9, 10, and 11 the cams 41 will not touch the hubs of the wheels. When the bar 6 is rotated to a position for freeing the projections on the jaws 14 from the thills 2, the cams 41 will be positioned so as to bear tightly against the inner ends of the hubs of the wheels 3, thus exerting a braking pressure on the wheels. As soon as the resilient cams 41 are brought against the hubs of the wheels 3 the forward rotation of said wheels will cause the cams to be more tightly forced against the hubs, thus assisting the driver in applying the brakes. By rotating the rock-bar 6 in the opposite direction the cams 41 will again be released from pressure against the hubs of the wheels.

My invention may be applied to various styles of vehicles, whether possessed of shafts or of tongues.

Various modifications of my invention may be resorted to without departing from its spirit.

Having thus described my invention, what I claim, and desire to secure by Letters Patent, is—

1. The combination with the axle, of a thill-coupling supported thereby, and provided with means for releasably engaging a thill, a rock-bar, means for rocking said bar to and fro, resilient means for resisting rocking of the bar until said bar has been rocked to a certain position in a certain direction and thereafter assisting rocking of the bar in said direction, and means by which, when said bar is properly rocked, the thill-coupling will be actuated so as to release the thill held thereby.

2. The combination with the axle, of two thill-couplings supported thereby and provided with means for releasably engaging two thills respectively, a rock-bar, means for rocking said bar to and fro, resilient means for resisting rocking of the bar in either direction until the bar has been rocked to a certain position and thereafter assisting rocking of the bar in the said direction, and means by which, when the bar is rocked in the proper direction, the thill-couplings will be actuated so as to release respectively the two thills engaged by said couplings.

3. The combination with the axle, of a thill-coupling supported thereby and provided with means for releasably engaging a thill, a braking device adapted to engage a wheel mounted on the axle, a rock-bar, means for rocking said bar to and fro, resilient means for resisting rocking of the bar from one position to the other in either direction until said bar has been rocked to a given position and thereafter assisting in the rocking of the bar in the same direction, and means by which, when said bar is rocked in the proper direction, the braking device will be operated to engage the wheel and the thill-coupling be actuated so as to release the thill held thereby.

4. The combination with the axle, of two thill-couplings supported thereby and provided with means for releasably engaging two thills respectively, a braking device adapted to engage a wheel mounted on the axle, a rock-bar, means for rocking said bar to and fro, resilient means resisting rocking of the bar in either direction until the bar has been rocked to a given position and thereafter assisting further rocking of the bar in the same direction, and means by which, when the bar is rocked in the proper direction, the braking device will be actuated so as to engage the wheel and the two couplings will be actuated in a manner to release two thills engaged thereby.

5. The combination with the axle, of a clip mounted thereon, two jaws mounted on said clip and movable toward and from each other and provided with means for engaging between them releasably, a thill, means for moving said jaws in a direction to release the thill, and means for retracting said jaws in the opposite direction.

6. The combination with the axle, of a clip supported thereby, two jaws pivoted to said clip and provided with means for supporting a thill between them, means for swinging said jaws apart so as to release the thill, and means for retracting said jaws in the opposite direction.

7. The combination with the axle, of two clips mounted thereon, two pairs of jaws pivoted one pair to each of said clips, each pair of jaws being provided with means for releasably engaging a thill between them, means for simultaneously swinging apart the jaws of each pair, and means for retracting the jaws in the opposite direction.

8. The combination with the axle, of a clip mounted thereon, two jaws movably mounted on said clip and provided with means for releasably engaging the thill between them, a movable member, and means, when said member is properly moved, for moving said jaws relative to each other.

9. The combination with the axle, of a clip mounted thereon, two jaws pivoted to said clip and provided with means for releasably engaging a thill between them, a movable member, and means for swinging said jaws when said member is properly moved.

10. The combination with the axle, of a clip mounted thereon, two jaws movably mounted on said clip and provided with means for releasably engaging a thill between them, a rock-bar and means, when said bar is properly rocked, said jaws will be moved relative to each other.

11. The combination with the axle, of a clip mounted thereon, two jaws pivoted to said clip and provided with releasable means for engaging between them a thill, a rock-bar and means for swinging said jaws when the bar is rocked in the proper direction.

12. The combination with the axle, of a clip mounted thereon, two jaws mounted on said clip and movable toward and from each other and provided with means for releasably engaging a thill, resilient means for forcing said jaws apart to release the thill, and means for moving the said jaws in the opposite direction.

13. The combination with the axle, of two clips mounted thereon and provided with means for releasably supporting between them a thill, resilient means for swinging said jaws apart so as to release the thill, and means for swinging the jaws in the opposite direction.

14. The combination with the axle, of a clip mounted thereon, two jaws mounted on the clip and movable toward and from each other, and provided with means when properly positioned, for releasably engaging between them a thill, resilient means for forcing the jaws apart to release the thill, a movable bar and means for forcing said jaws toward each other when the bar is properly moved.

15. The combination with the axle, of a clip mounted thereon, two jaws mounted on said clip, and provided with means when properly positioned, for releasably engaging between them a thill, resilient means for forcing said jaws apart to release the thill, a rock-bar, and means for forcing said jaws toward each other when the bar is properly rocked.

16. The combination with the axle, of a clip mounted thereon, two jaws pivoted to the clip and provided with means for releasably engaging between them a thill, resilient means for swinging said jaws apart to release the thill, a movable bar, and means for swinging said jaws toward each other when the bar is properly moved.

17. The combination with the axle, of a clip mounted thereon, two jaws pivoted to the clip and provided with means for engaging a thill, resilient means for swinging the jaws apart, a rock-bar, and means for swinging said jaws toward each other when the bar is properly rocked.

18. The combination with the axle, of two clips mounted thereon, two pairs of jaws movably mounted, one pair on each clip, each pair being provided with means for engaging a thill, resilient means for forcing the jaws of each pair apart, and means for simultaneously moving the jaws of both pairs in the opposite direction.

19. The combination with the axle, of two clips mounted thereon, two pairs of jaws pivoted one pair to each clip, each pair being provided with means for releasably engaging between them a thill, resilient means for swinging apart the jaws of each pair, the rock-bar, and means for swinging the jaws of each pair toward each other when the bar is properly rocked.

20. The combination with the axle, of two couplings supported thereby, and provided with means for releasably engaging two thills respectively, a braking device adapted to engage a wheel mounted on the axle, a rock-bar, means by which said bar may be rocked to and fro, resilient means for retaining the said bar in two positions to which it may be rocked, means controlled by the rocking of said bar for releasing the couplings from the thills, and means for applying the braking device to the wheel simultaneously with the releasing of the thills by the couplings.

21. The combination with the axle, of two clips mounted thereon, two pairs of jaws pivoted one pair to each clip, each pair being provided with means for releasably engaging a thill, a braking device, means for forcing said jaws apart to release the thills, a rock-bar, means by which said bar may be rocked to and fro, means controlled by the rocking of the bar for actuating the braking device, and means controlled by the rocking of the bar for controlling the swinging of the jaws apart.

22. The combination with the axle, of two thills, two couplings supported by the axle and provided with means for releasably engaging said thills respectively, a rock-bar, a cam-shoe carried by said rock-bar, and means controlled by the movement of said bar for releasing the thills from said couplings.

23. The combination with the axle of two thills, two couplings supported by the axle and provided with means for releasably engaging said thills respectively, a rock-bar, a resilient cam-shoe carried thereby and adapted to engage one of the vehicle-wheels, and means controlled by the movement of said bar for releasing the thills from said couplings.

24. The combination with the axle, of two thills, two couplings supported by the axle and provided with means for releasably engaging said thills respectively, a rock-bar, means controlled by the rocking of said bar for releasing the thills from the couplings, a brake-shoe mounted on and movable with said rock-bar, and means for rocking said bar.

25. The combination with the axle, of the wheels mounted thereon, two thills, two couplings supported by the axle and provided with means for releasably engaging said thills respectively, a rock-bar, means controlled by the rocking of said bar for releasing the thills from said couplings, means for rocking said bar, two brake-shoes carried by said rock-bar and adapted when the bar is properly positioned to engage respectively with the vehicle-wheels.

In testimony whereof I have signed my name to this specification in the presence of two subscribing witnesses.

HARLAN H. HARSHAW.

Witnesses:
  WARREN D. HOUSE,
  HENRY F. ROSE.